US008708709B2

(12) United States Patent
Kallander

(10) Patent No.: US 8,708,709 B2
(45) Date of Patent: *Apr. 29, 2014

(54) METHOD AND APPARATUS FOR EDUCATING AND INFLUENCING AN INDIVIDUAL

(71) Applicant: Sandra Kallander, Pacheco, CA (US)

(72) Inventor: Sandra Kallander, Pacheco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/849,954

(22) Filed: Mar. 25, 2013

(65) Prior Publication Data

US 2013/0216987 A1     Aug. 22, 2013

Related U.S. Application Data

(63) Continuation of application No. 13/272,831, filed on Oct. 13, 2011, now Pat. No. 8,403,678, which is a continuation of application No. 11/159,564, filed on Jun. 22, 2005, now Pat. No. 8,038,448.

(51) Int. Cl.
    *G09B 7/00*    (2006.01)

(52) U.S. Cl.
    USPC .......................................... 434/323; 434/236

(58) Field of Classification Search
    USPC ................. 434/236, 323, 350, 322, 362, 365; 705/12, 26.7, 27.1; 706/47
See application file for complete search history.

(56) References Cited

U.S. PATENT DOCUMENTS

| 5,727,950 | A  | * | 3/1998  | Cook et al. ................... 434/350 |
| 5,978,784 | A  | * | 11/1999 | Fagg et al. ....................... 706/45 |
| 6,070,149 | A  | * | 5/2000  | Tavor et al. .................. 705/26.7 |
| 6,112,049 | A  | * | 8/2000  | Sonnenfeld ................... 434/350 |
| 6,334,192 | B1 | * | 12/2001 | Karpf ................................. 714/1 |
| 6,511,326 | B1 | * | 1/2003  | Galanter et al. .............. 434/322 |
| 7,006,980 | B1 | * | 2/2006  | Snyder ........................... 705/7.37 |
| 7,315,725 | B2 | * | 1/2008  | Sachs et al. ................... 434/350 |
| 2002/0146676 | A1 | * | 10/2002 | Reynolds ....................... 434/362 |
| 2003/0078838 | A1 | * | 4/2003  | Szmanda ......................... 705/14 |
| 2004/0204979 | A1 | * | 10/2004 | Eisenberg et al. ............. 705/10 |
| 2004/0267816 | A1 | * | 12/2004 | Russek ....................... 707/104.1 |

* cited by examiner

*Primary Examiner* — Peter Egloff
(74) *Attorney, Agent, or Firm* — Carlos R. Villamar; The Villamar Firm PLLC

(57) ABSTRACT

A method and apparatus for influencing a person to develop, accept and/or understand a concept, position or idea using questioning, including a technique sometimes known as the Socratic Method. A universe of question and answer subsets comprising questions and respective multiple choice answers to each question designed in advance, arranged and interconnected on a stand-alone computer, a computer on a local area network or computer network, or any computer network and displayed in such a way as to allow the participant to follow the individual's own path by selecting answers he accepts, which tend to logically lead the individual toward agreement and or understanding on the subject.

18 Claims, 4 Drawing Sheets

METHOD AND APPARATUS FOR EDUCATING AND INFLUENCING AN INDIVIDUAL

FIELD OF THE INVENTION

The present invention relates to a method for education, teaching of concepts and values, sales and persuasion, sales and teacher training, and apparatuses therefor.

BACKGROUND

Teachers, salespeople, counselors and hostage negotiators often use questions to lead participants (e.g., students, visitors, prospects, customers, patients, etc.) to reason for themselves and reach a logical conclusion desired by the interrogator through use of the Socratic Method. The advent of computers and the world wide computer network commonly referred to as the "Internet" has caused a rapid increase in contacts where a self-directed participant initiates contact with and explores a website. (Applicant at times refers to a "website" as a "site" herein.) However, the use of questions or prompts based on prior responses in a series leading to a particular desired conclusion has not been automated to utilize these innovations.

Currently a site or software at a site may be designed for a "target participant" and be capable of handling common questions, objections, concerns, or misconceptions in a broadcast manner, with at most, an offer of "more information." A "target participant" is a person exhibiting a predetermined set of characteristics i.e., characteristics preferred by the operator or owner of the site. A site may be constructed without the site's designer knowing whether common parameters apply to a particular visitor. Unlike an inter-personal contact between, for example, a student and a teacher, which is interactive, customized and variable, sites have not been designed to attempt to lead any particular individual participant regardless of who they are to a desired conclusion by using a participant's own responses to a series of prompts.

Presently many designers of software programs for sites obtain data through surveys to determine what presentations are preferable for "target participants," and what are the potential objections, attitudes, preferences and values of participants. Present day designers of sites use this information to create materials to display at websites. The viewing of such displays at sites by individuals is similar to a TV commercial broadcast, that is, the material presented is created with the aid of market research to be appealing to the expected general viewer. TV commercial broadcast and present day websites do not customize the message for each individual TV viewer or web site page visitor in a persistent interactive way.

Some present day websites or software programs permit the website visitor to provide additional information so that a determination may be made as to what other material or information to display to the site visitor. For example, a site that is directed to movies and theater may have the capacity to receive Zip Code information from the viewer. The viewer may then enter a Zip Code and the display will change to list the theaters within the Zip Code area along with the movies being shown at each theater and the show times. However, present day websites suffer from the limitation that they do not reason with the individual site visitor and they do not utilize the knowledge, prejudices and personal characteristics of a particular site visitor in order to change the mind of the visitor. Some present day websites may display questions and request responses to test the understanding of the participant before the participant is taken to the next step, or next web page, (i.e. next display). However, such websites though they may provide test results (i.e., visitor response data to the operator of the website) and may even require a certain response before displaying the next web page, they do not attempt to persuade, reason or lead the visitor to a conclusion in a persistent "interactive" fashion. Such websites merely elicit present opinion, knowledge or other types of information from the site visitor, or offer opinion, knowledge or other types of information to the site visitor. Sites that are more than a survey (i.e., more than mere data gathering sites) still do not attempt in a step-by-step logical manner, to lead the visitor to change his mind, make a decision or learn by repeated questioning to determine whether the participant reads, understands or is satisfied with the information already presented, providing additional persuasive material, and testing whether he has been led to reevaluate his position or change his mind on a particular topic or issue. (As used herein, masculine pronouns include the feminine and vice versa.)

There is thus a need for interactive websites and the like which are capable of using logic and reason to guide a visitor from an initial position or opinion to a position or opinion desired by the site designer in a logical and rational manner and, potentially, to elicit some action by the visitor which is desired by the site designer or operator. Additionally, there is a need for interactive websites and the like which are capable of using logic and reason to reinforce a position or opinion of a visitor that concurs with the position or opinion desired by the website designer or operator through a logical, rational process, and potentially to elicit some desired action by the visitor.

SUMMARY OF THE INVENTION

The invention may be utilized in but is not limited to areas of sales, general education, politics, mental health, marital and family counseling, conflict resolution, religion, morality, and any other activity where the participant's reasoning can be logically guided by the designer's questions toward alignment with the designer's preferred conclusion.

The invention may be implemented on an array of electronic devices, including, but not limited to the Internet, a local area network, an individual computer, cell phone, interactive television or any other device where questions and answers can be programmed in advance, communicated to a participant and a response by the participant can call up the next related question. Every reference to "question," "questions" and "question(s)" herein is intended to include prompts of any kind, and every reference to "answer," "answers" and "answers(s)" means a response or potential response to the prompt or question.

As will be appreciated, the invention may be practiced in various modes. By way of example, and not by way of limitation, the designer of a website (or the like) may start by determining the goal. For example, a goal may be changing an individual's opinion from "in favor of a higher minimum wage" to "against a higher minimum wage," or changing a person's opinion of a product, service or other matter from negative to positive, or guiding a student to figure out how to do math in binary, or any other goal that may be arrived at in a logical manner. The designer then determines what steps are necessary or advisable to lead participants to align with the predetermined goal.

The designer prepares "key" questions, one or more answers to which indicates progress toward the goal. The "key" questions are similar to major intersections on a logic diagram, or map. The intersections on the logic diagram or map represent primary nodes in the logical structure of the diagram or map which also includes the alternate paths that may be taken when a participant does not choose the direct route to the designer's goal or does not choose the answer most in alignment with the designer's goal. Although it may assist in accomplishing the design process, it is not required that the logic diagram or structure actually be drawn or written, especially as the logic diagram is not limited to two-dimensions. The logic structure may be N-dimensional, where N=2, 3, 4 . . . . The logic structure remains invisible to the participant who experiences each question and multiple-choice answer subset as if taking a survey. In reality, each question actually puts him at a crossroads with a choice of directions to take. If he could see the map, he would realize that all the answers represent steps on the way to the same destination, but that there are alternate routes which are only sometimes overlapping and of various lengths.

Between any two primary nodes in the logic structure there may be one or more secondary nodes. The secondary nodes are thus transition positions between the primary nodes and are representative of logical steps between the primary nodes. Between any two secondary nodes in the logic structure, there may be one or more tertiary or third level nodes, which are transition positions or logical steps between the secondary nodes. This logic structure may be repeated at lower logic levels, e.g., between fourth, fifth, . . . , etc. level nodes. As will be appreciated, the logic structure may be highly complex.

A participant answers a series of questions from a predetermined universe of question and answer subsets, as if taking a survey. The participant is presented with one question at a time along with a subset of answers. The participant selects an answer to the question, with which he agrees, from the list of predetermined answer choices. Each answer he selects causes him to be presented with another predetermined question and answer subset from the universe of question and answer subsets. Unlike a survey, the participant may feel as if an interested listener is interviewing him, because the question presented to him tends to follow or be related to his previous answer.

The universe of question and answer subsets optimally comprises qualifying question and answer subsets, leading question and answer subsets and closing question and answer subsets. The universe of question and answer subsets is described in detail herein.

Participants may participate either electronically, or person-to-person. In a preferred embodiment, a computer system is utilized with the question and answer subsets being capable of being projected on a display. Each answer chosen by the participant may be linked to a predetermined question and related answers i.e., the question and answers displayed are responsive to the answer chosen by the participant to the previous question, and follows logically toward the predetermined goal of the designer. The designer's goal may be a particular answer(s) to a particular question or series of questions (hereinafter the "Target Answer").

BRIEF DESCRIPTION OF THE DRAWINGS

The following drawings are for illustrative purposes and are schematic in nature.

DESCRIPTION OF PREFERRED EMBODIMENT

The present invention will now be described more fully hereinafter with reference to the accompanying drawings in which preferred embodiments of the invention are shown. The invention may, however, be embodied in many different forms and should not be construed as limited to the embodiments set forth herein; rather, these embodiments are provided so that this disclosure will be thorough and complete and will fully convey the scope of the invention to those skilled in the art. The applicant incorporates by reference herein the Summary of the Invention set forth above.

Figure 1:
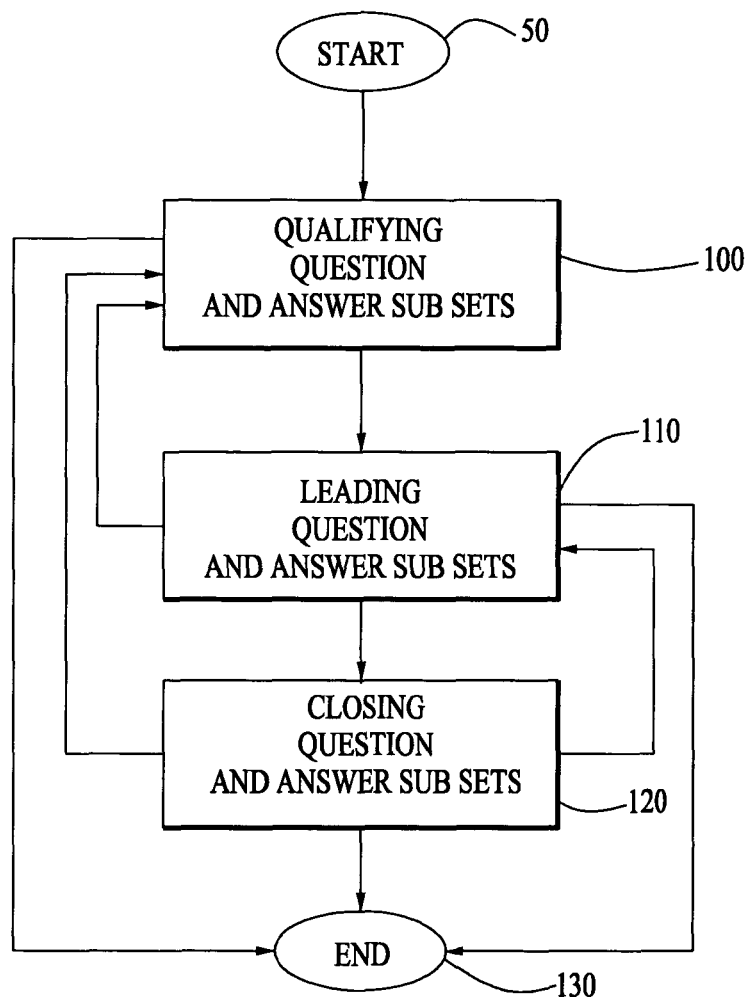
FIG. 1 is a diagram showing the interrelationship of various question and answer subsets of a preferred embodiment of the invention.

Initially referring to FIG. 1, there is depicted therein, a diagram illustrating the interrelationship of three question and answer subsets. The universe of question and answer subsets comprises qualifying question and answer subsets 100, leading question and answer subsets 110 and closing question and answer subsets 120. The term universe of question and answer sets does not refer to all possible questions and answer sets that are theoretically possible but to the questions and answer sets determined by the designer.

If a participant agrees to participate, the procedure begins 50. A set 100 of qualifying questions is presented with a plurality of answers for each question. In a preferred embodiment of the invention, described in detail herein, a display such as a video display terminal, is utilized. It will be understood that the invention is not limited to the visual display of question and/or answers but includes the audio communication thereof Accordingly, while the description below is directed to visual displays of information, the invention is not so limited but includes the audio communication of information to and from the participant.

Only one question at a time appears on the video display terminal along with the question's respective multiple choice answers, i.e., a single question appears on the display with a list of multiple choice answers from which the participant may choose a response. (As described below a question may also request a reply comprising specific information.) The participant chooses an answer from the list of multiple choice answers and signifies his choice. The participant signifies his choice through the equipment used to communicate with the computer, such as a keyboard, touch screen, mouse controlled pointer or other type of computer control communication device. For example, the first question may be "What language do you prefer?" This question may appear with a list of languages as alternative languages. The answer chosen by the participant determines the language of the remainder of the questions and answers. Any questions, the answers to which are not subject to change and which the designer desires to accommodate by customizing the remainder of the process are preferably asked first. As will be appreciated, the participant may signify his choice verbally and the verbal response may be interpreted by the use of verbal recognition equipment well known to those skilled in the art, or by another individual acting as an intermediary.

As those having ordinary skill in the art will appreciate, the participant may give the answers to questions by choosing the answer from a provided list of possible answers or by the participant entering certain specific information in one or more designated areas of the display. For example, a participant may be asked, "What is your age?" and be provided with a list of numbers representing age and the participant may choose his age from the list. Alternatively, the question "What is your age?" may be followed by an area on the display in which the participant may enter using a device such as a keyboard, a number signifying his age in a conventional manner.

These initial qualifying questions, if any, are preferably followed by the question needed to determine participant's current state in relation to the Target Answer(s), the answer(s) desired by the designer. This question may be exactly the same question as the Target Question or a variation thereof.

As may be appreciated, some participants may already agree with the designer's Target Answer(s) or already have competence in the concept being taught, while others do not, as indicated by their answer(s).

The designer's primary purpose is to organize and design questions in such a way that it seems to the participant as if the process desires to find out, using qualifying questions, who the participant is and where he is starting in relation to the designer's goal, and to instill confidence in the participant by referring to answers or further expounding on answers the participant provided and agreed with, using sales and teaching techniques well known to those having ordinary skill in the art.

Although, for purposes of illustration, qualifying questions are asked first followed by leading questions, qualifying questions may be asked whenever thought useful (in sales, this is known as or called "re-qualifying"). Sometimes it may be of benefit to delay some qualifying questions until a later relevant point in the process.

The initially asked qualifying question(s) should be ordered to lead to the Target Question(s) which identifies the participant's current state in relation to the designer's desired state.

Preferably, further qualifying question or questions follow, designed to elicit the reasons for the participant's current opinion or the level of the participant's current understanding, as appropriate, or, if the answer given is the desired answer to the Target Question, a question(s) evaluating the strength of that opinion or further testing of the participant's competence regarding a subject may be presented.

Those participants whose answers indicate continued agreement or competence may then be asked the Target Question again (or a variation thereof) and/or be asked closing questions 120. The process ends 130 at a point that is determined based upon the participant's response(s) to various question(s) in the universe of question and answer subsets as determined by the designor.

The qualifying questions preferably end with a "Key" qualifying question designed to separate various participants' responses along the most divergent lines applicable by offering diverging answers. For example, the question "Why?" may be followed by a choice of answers comprising a plurality of likely responses.

In a preferred embodiment, the participant may be questioned regarding his position on an issue. For example, if the issue is the minimum wage, the target qualifying question, "Do you think the minimum wage should be raised?" may be asked with the following presented answers: "Yes," "No," or "I don't know." Each of these responses may be followed by the key qualifying question "Why?" In this example, for the participant who initially answered "Yes," the answer choices for the next question ("Why?") might include "My party recommends it," "I have many friends who work for minimum wage and need the money," or "It will help the less fortunate." (Note that the second answer may also serve to make the participant realize that he does not know anyone who works for minimum wage.)

The participant that answered "No" may be given a choice of answers for why he does not think the minimum wage should be raised. When "No" is the Target Answer, this also serves the purpose of reminding him of additional reasons to reinforce his response of "No."

After the participant responds to the qualifying subset of questions and answers, the participant is provided questions and answers from the leading question and answer subsets 110.

Leading questions and corresponding answers may become increasingly specific (whereas qualifying questions may tend to diverge). For example, the participant that answered, "yes" to the target qualifying question may be presented with a leading question requesting the participant to select a reason for the participant's position from a predetermined list of reasons. One or more primary and/or secondary issue questions may be asked concerning the participant's current opinions, conclusions, values, goals, or any issue chosen by the designer. As will be explained in further detail below, the participant's response may aid in determining a preferred approach to reasoning with the participant.

Each participant in choosing answers to a series of leading questions follows a path determined by his chosen answers to the presented questions. (It should be understood that the term "leading question" as used herein does not necessarily mean a question which suggests a particular answer. In the invention, a question may or may not suggest an answer. Instead, a "leading question" is one in a series of questions or prompts leading the participant to follow a line of reasoning toward the Target Answer(s). Depending on his prior answer(s), questions (and their respective answers) preferably begin to either reinforce or challenge his beliefs and conclusions.

The participant who aligns with the designer's goal may advance quickly, even directly to the closing question and answer subset 120. A participant who does not align with the designer's goal is led to examine his logic, facts and/or strength of his conviction through the question(s) and answers presented to him For example, if a participant suggests a solution to a problem which is not a step toward the desired solution or goal and/or which could potentially cause an ancillary problem or undesirable consequence(s), the participant may be asked if he considered a certain potential problem(s) or consequence(s) in choosing a solution. He may then be questioned on this opinion concerning the magnitude of the potential problem(s) and/or the probability of the potential problem(s) occurring and/or the cost of correcting the potential problem(s) or consequence(s). Multiple-choice answers offered to the participant may also cause the participant to consider such answers and the potential consequence (s) of a prior choice(s). A subsequent question(s) and its respective list of answers may ask whether potential or an actual problem(s) caused by his preferred solution (i.e. answer) is worse than the original problem. Thus, the participant is questioned concerning the unintended consequence(s) of his previous choice or answer and is helped to abandon short-sighted positions or to build upon knowledge he already has by following a line of reasoning to its logical conclusion.

The designer's objective is to get the participant to adopt the designer's preferred position and abandon the participant's initial position if it is in conflict. Similarly, the sales technique of asking questions about the prospect's needs, asking whether particular features of a product meet those needs, and ultimately to obtain a purchase commitment (e.g., "Will that be cash or charge?") can be automated by linking questions to answers given by the prospect, in a way that is special to the prospect.

At a point during the participant's responses to the leading questions, when a particular chosen answer by the participant indicates that the participant has shifted his perception, opinion or understanding toward a particular key question or toward the Target Answer(s), the participant may be exposed to the closing question and answer subset 120. Closing questions and answers may be displayed on the display in response to the answer signifying the participant's shift. The closing question and answer subset 120 tests whether the participant has abandoned his original conclusion, belief or opinion or learned a new concept, or whether the participant still has other reasons for objecting to or disagreeing with the designer's goal. Depending on the participant's answer(s) to question(s) in the closing question and answer subset, the participant may be routed to a previous key question where the participant may then choose a different answer from the list of multiple choice answers, and start on a "side-trip" or alternative series of question(s) and answers regarding the issue or concept, as described in additional detail below.

After displaying one or more key closing questions and receiving an answer choice from the participant that is as close to the designer's objective as is acceptable to the designer, in a preferred embodiment, the display will present indicia thanking the participant for participating and may also include offers to join, purchase, be contacted, or whatever option the designer deems appropriate. These offers may vary, again, depending on the prior answer(s). The procedure is then completed 130.

The invention is sufficiently flexible that the participant's responses to the qualifying question and answer subsets 100 may fall within a predetermined response pattern indicating that the participant's opinion or position is such that the participant will be transferred to the closing question and answer subsets 120 (bypassing the leading question and answer subsets 110) or the process may be ended 130. For example, the participant may be directed to the closing question and answer subsets when the participant's responses to the qualifying question and answer subsets indicates that the participant is already in agreement with the designer's Target Answer.

Similarly, a participant's responses to the leading question and answer subsets may fall within a predetermined response pattern indicating that the participant's opinion or position is variable and the participant may be redirected to the qualifying question and answer subsets 100 or the process may be ended 130. For example, the participant may be redirected to the qualifying question and answer subsets when the participant's responses to the leading question and answer subsets indicates that the participant has an inconsistent opinion, i.e., the participant responds to the leading question and answer subsets in a manner indicating that the participant's opinion concerning a topic or issue is changing or unsettled.

Also, the designer's sequence(s) to certain of the question and answer subsets may be such that the designer has predetermined that at a certain point the participant should be routed to the closing question and answer subsets 120 or to the leading question and answer subsets 110. For example, this may occur when the participant chooses the designer's preferred response to one or more "key" questions on a particular issue(s) and the participant is routed to the closing questions and answer subsets. Also if the participant provides an answer to one or more of the questions in the closing question and answer subsets which indicates he is not in agreement with the designer's goal, the participant may be routed back to the qualifying question and answer subsets or the leading question and answer subsets.

It will be appreciated that all references to "questions" and "answers" herein could just as well be described as "prompts" and "responses" and to the extent that questions and answers are used, the participant may believe he is participating in a survey. However, though it is possible to keep the participants' answers as data, it is rather the process of being led to consider data and learn new concepts through the use of questions and answers that is the purpose for asking specific questions in a sequence order determined by both designer and participant interactively.

In general, an attempt should be made to present all of the participants with an answer to each question in the displayed multiple-choice format with which the participant can agree. Preferably, questions are phased in a neutral manner. It may, however, be useful at times to display non-neutral questions, but offer in the list of possible answers an answer that states that the participant believes the question is manipulative, biased and/or not relevant. Sufficiently often to prevent frustration, the participant may be offered an answer which allows him to abandon the line of reasoning and be offered the next "key" question or alternate line of reasoning which is not dependent on having obtained his agreement with or understanding of the prior "key" question, issue or concept. A determinedly disagreeable participant may get through the questions as quickly as an agreeable one. Participants who are open to examining an issue or concept without a preconceived opinion or position, may take a circuitous route, answering most questions inconsistently and/or frequently changing their minds.

In another preferred embodiment, an answer to one or more of the questions may be to contact the designer to suggest another answer. This allows the designer to consider these answers for addition along with any counter-arguments (in the form of additional question and answer subsets which may be created) and helps prevent frustrating the participant. When such an option is chosen, the participant may also be invited to return and choose a second answer or be asked another question returning to the leading question and answer subsets 110 (or one of the other question and answer subsets) at an appropriate point. In another preferred embodiment, the ability to "go back," or "undo" a previous answer(s) may be included, as at times participants may desire to reconsider an answer (e.g., when more than one is agreeable or when the participant simply changes his mind, etc.) Though it may appear to the participant that he is changing his answer to a survey, the purpose of allowing a changed answer is to present a different follow-up question(s) to the participant.

In still another embodiment of the invention two or more answers to a question may elicit the same next question. This would occur when the designer decides that more than one answer leads logically to the same next question, or because the real purpose of the question is to get the participant to consider the alternate answers or the data contained in them. For example, if, after having determined that a participant has an unyielding opinion regarding the proper political solution to a problem, the designer wishes to demonstrate to the participant that as strongly as he might prefer that solution, he does not have a strong enough majority to prevail, the alternate solutions he rejects serve to make the point that there is little or no consensus.

The next question may ask about the likelihood of reaching consensus to test whether the point has been understood and, if it has, the next question may offer a compromise solution.

There may be other instances where, regardless of which answer is chosen, the same next question may be presented. In this way, new ideas may be suggested in the answers presented and, regardless of which answer is chosen, one question may be presented as the follow-up to two or more of the multiple choice answers presented. Similarly, ideas, facts or information may be contained in the displayed answers to a question instead of set forth in the question. In this way, the participant may reject the information if he chooses (e.g., if he thinks it is biased) and choose an answer with which he agrees. A different participant may choose differently. Each participant would then follow a different course in the structured question and answer subsets.

Generally, it is preferable to not attempt to force agreement. The participant, if he feels he is being compelled or forced to accept a particular opinion or position, may react negatively and he may perceive his prior opinion or position strengthened. Additionally, the participant may cease participating thus eliminating the opportunity of potentially changing the participant's opinion or position.

Questions may also be implied, as when a sentence is started, and the multiple choice "answers" consist of phrases completing the sentence. Alternatively, the question may not directly set forth an answer, but the multiple choice responses may comprise one or more comments or responses, which do not directly answer the question.

Also, questions and answers are not limited to text. Pictures, video clips or animation may be used. For example, a participant who has stated that handguns should be banned for the safety of the population might be asked the question "Which one of these people would probably win if they fought?" followed by a picture of a large threatening man and another picture of a little old lady. The participant may then pick one. Regardless of which one he picks, the next leading question presented is "Which one of these people would probably win if they fought?" Following the question may be a picture of a little old lady, and another picture of a little old lady holding a baseball bat. The participant then picks one.

Regardless of which one he picks, the next leading question, for example, presented is: "Which of these two people would probably win if they fought?" Two pictures may, for example, then presented: One of a large threatening man holding a bat, and one of a little old lady pointing a handgun, plus a third answer may be presented in text form such as: "Stop trying to manipulate me; I still don't believe little old ladies should have guns." Such a sequence illustrates a question and answer subset directed toward the designer's target goal of increasing support for relaxing handgun restrictions for self-defense using pictures.

Pictures used in either questions or answers may be animated or moving pictures such as video clips, with or without audio. A "virtual" person representing a sales person, teacher, counselor or guide could be created to present each question using such a technique.

As explained above, questions and answers may be presented to the participant audibly through the use of technologies such as speech recognition technologies and the like and a participant's answers may be recognized either by traditional response technologies such as a keyboard, computer, mouse, etc. or the participant verbally responds and the response may be may be accepted and utilized in the invention by means of voice recognition technology known by those having ordinary skill in the art. Likewise, an individual may act as intermediary such that a participant may respond to questions by telephone, where the questions are read to him by another individual who also inputs his responses into a computer, calling up the next question to be read.

Figure 2:
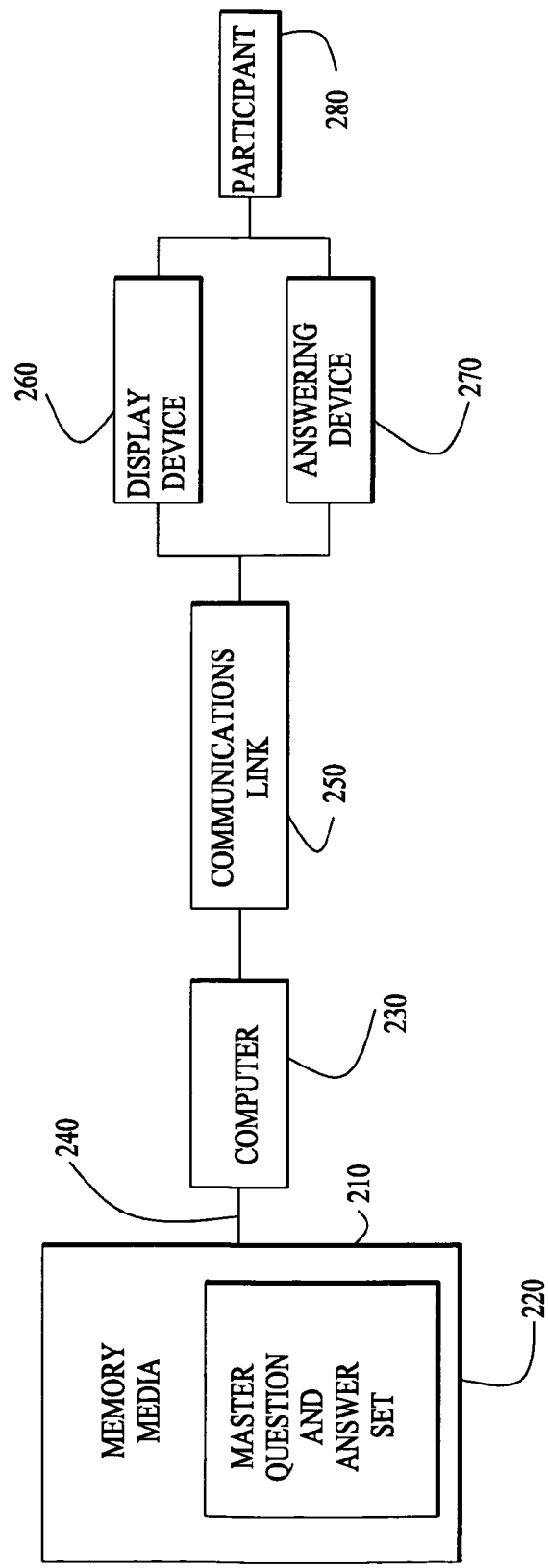
FIG. 2 is a diagram of an apparatus implementing a preferred embodiment of the invention.

Referring now to FIG. 2, there is shown therein a memory media 210 on which is stored a master question and answer set 220. The memory media 210 and the master question and answer set 220 are able to communicate with the computer 230 by means of communications channel 240. The communications channel 240 is of the type well known to those having ordinary skill in the art and may be cables, fiber optics, or any other type of communications channel, which is capable of transmitting digital or analog signals.

A computer 230 is operably connected to one end of a communications link 250. The communications link 250 may be a type of communications channel including but not limited to cables, local area network, the Internet, or any other apparatus or hardware, either individually or combined, which is capable of transferring digital or analog signals. Another end of the communications link 250 is operably connected to a display device 260 and an answering device 270. The display device 260 could be any type of display including but not limited to a computer monitor, liquid crystal display ("LCD"), touch screen monitor, plasma screen, etc. The answering device may be any type of hardware which is capable of taking input from a user and converting it to digital signals to be sent to a computer or other type of digital processor. Such answering devices include but are not limited to computer keyboards, touch screens, computer mouse, cellular telephone or other type of telecommunications device and the like. Technologies such as speech recognition apparatus may also be utilized as answering devices.

The communications link is such that information may be sent from the computer 230 to the display device 260 and, similarly, signals from the answering device 270 may be sent to the computer 230.

Located within the computer or the memory media is an operating program which coordinates the presentation of questions and related answers on the display device as described herein.

Any software or hardware may be used which allows questions to be stored and presented in response to responses by the user. Question and answer subsets may be stored in a database as individual records or placed, for example, on web pages together with other data. One preferred embodiment of the invention is to use HTML and make every question an "anchor" (i.e. unique location), and each answer in its subset of answers a "hyperlink" to (bring up on the display in response to a chosen answer) the next question and its respective subset of answers thereto. Any data collected for use in generating subsequent questions or answers can be stored in the form of "cookies" or otherwise, in a manner well known to those having ordinary skill in the art.

It is not necessary to collect or save data given by the participant in response to questions, as in a survey. However, data may be collected and used to further customize the presentation of subsequent questions or answers by, for example, referring to the participant by name, referencing what type of pet they have in a later hypothetical question, or by the use of if/then logic in the program determining what questions to present. Further, programming could be used to generate custom questions or answers based on the data collected.

Figure 3:
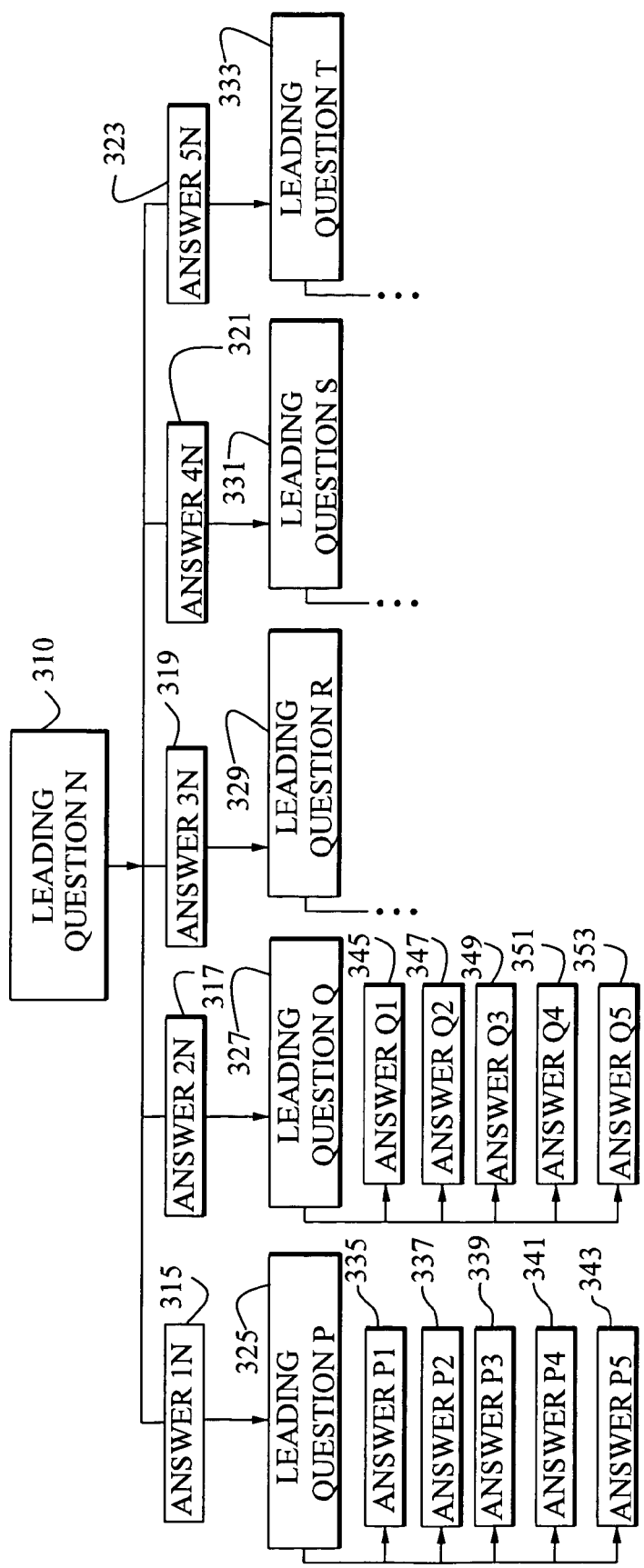
FIG. 3 is a diagram illustrating the relationship of a question and its associated multiple choice answers in a preferred embodiment of the invention.

Next, referring to FIG. 3, there is shown therein a random leading question N 310. The leading question N 310 has associated with it answer 1N 315; answer 2N 317, answer 3N 319, answer 4N 321, and answer 5N 323. It will be appreciated by those having ordinary skill in the art that the leading question N 310 may have associated with it more or less than 5 possible answers in the invention. Five potential answers are displayed in FIG. 3 for illustrative purposes only. As described in detail herein, leading question N 310 is presented to the participant along with answer 1N 315, answer 2N 315, answer 3N, 319, answer 4N 321 and answer 5N 323. The participant then chooses which of answers 1N through 5N, inclusive, that he prefers.

Each of answers 1N through 5N has associated with it a leading question. In this illustration, answer 1N has associated with it leading question P 325. Similarly, answer 2N (317) has associated with it leading question Q (327). Answers 3N, 4N and 5N (319, 321 and 323) have associated with them leading questions R, S and T (329, 331, and 333 respectively).

Additionally, each of the leading questions P, Q, R, S and T (325, 327, 329, 331, and 333) has associated with it an answer subset. In the illustration, leading question P has associated with it answer P1, answer P2, answer P3, answer P4 and answer P5 (335, 337, 339, 341 and 343, respectively). In the invention, if answer 1N (315) is chosen by the participant then the next question presented to the participant is leading question P (325) along with its answer subset P1 through P5 (335, 337, 339, 341 and 343, respectively). Similarly, leading question Q (327) has associated with it a predetermined set of answers: answer Q1 (345), answer Q2 (347) answer Q3 (349), answer Q4 (351) and answer Q5 (353). If the participant chooses answer 2N (317) then the next question presented to the participant is leading question Q (327) along with the set of answers associated with leading question Q, that is, answers Q1 through Q5 (345, 347, 349, 351 and 353), respectively.

Each of the other answers 3N, 4N and 5N (319, 321 and 323) has associated with it leading questions R, S and T (329, 331 and 333), respectively. Each of the leading questions R, S and T has with it a particular answer subset as described herein. The aforesaid question and answer subsets reside in memory such as media 210. It will be appreciated that any type of memory such as a computer hard drive, read only memory (ROM) or any other type of machine readable memory may be utilized.

Figure 4:
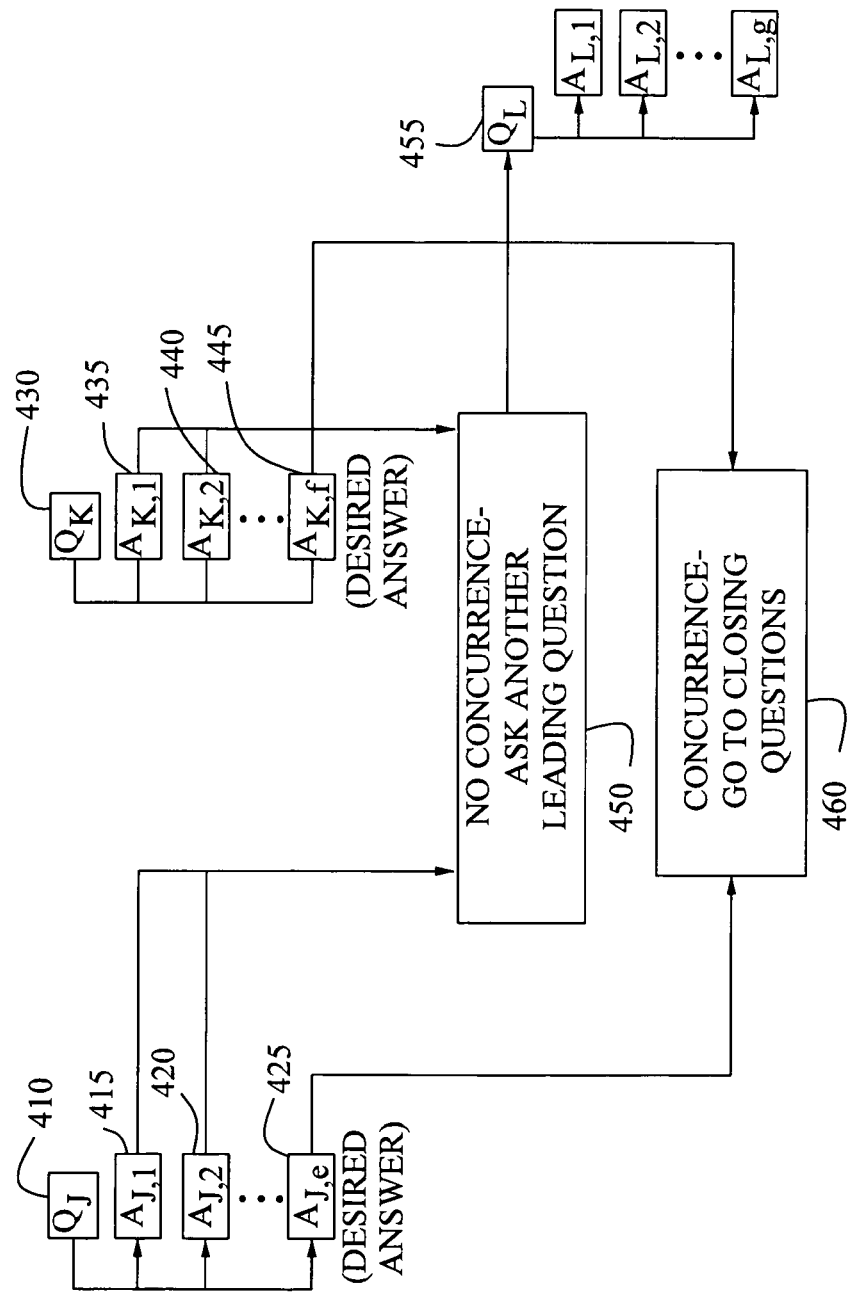
FIG. 4 is a diagram of two questions and their associated answers in a preferred embodiment of the invention.

Next, referring to FIG. 4, there is illustrated therein in schematic form two question and answer subsets with a plurality of answers leading to the same subsequent question. $Q_J$ is a question having associated answers $A_{J,1}$, $A_{J,2}$, through $A_{J,e}$, (415, 420 and 425, respectively.) It is important to realize that the number of answers presented to $Q_J$ (410) need not be any specific number in the invention. For illustrative purposes only, the number of answers associated with the question $Q_J$ is e in the illustration. $A_{J,e}$ (425) may be the answer desired by the designer. Similarly, question $Q_K$ (430) has associated with it answers $A_{K,1}$, $A_{K,2}$ through $A_{K,f}$ (435, 440 and 445, respectively). In the illustration, question $Q_K$ (430) has associated with it f multiple choice answers. In the illustration, $A_{K,f}$ (445) has been predetermined to be the desired answer.

In the illustration, $A_{J,1}$ and $A_{J,2}$ 415, 420 if chosen by the participant, indicate that there is no concurrence and the invention provides that the participant will be asked another leading question at step 450. In the illustration, the next leading question based upon the answer chosen by the participant is question $Q_L$ 455, which also has a predetermined set of answers associated with it, $A_{L,1}$, $A_{L,2}$, . . . , $A_{L,g}$. Similarly, if the participant chooses answer $A_{K,1}$ or $A_{K,2}$ to question $Q_K$, such answers indicate that there is no concurrence by participant and at step 450 the determination is made to ask the participant another leading question. The next question is $Q_L$ 455.

If the participant chooses answer $k_{J,e}$ to $Q_J$ or answer $A_{K,f}$ to question $Q_K$ the answer indicates concurrence. The invention recognizes this and begins to present to the participant closing questions and answer subsets at step 460.

By way of example and not by way of limitation, applicant sets forth below an example. The example, regarding a local government issue, demonstrates how a participant may respond to questions and the choosing of subsequent questions by use of the invention. In the example below, the answers chosen by the participant to each of the questions is indicated by underlining. For brevity, qualifying questions and answers have been omitted. However, those having ordinary skill in the art will appreciate that such qualifying question and answer subsets may be utilized.

The objective in the example is to get the participant to agree that an existing utility tax is too high, is not fair, is not well spent, or actually hurts some people or themselves. Agreement with the "key questions," are steps toward having the participant agree to vote to lower the tax, the Target Answer. (Studies indicate that a strong agreement with any one of these key questions is sufficient to get support.) An additional objective is to have the participant feel negatively toward the opponents of a utility tax decrease. Another goal is to have the participant's values validated when it concurs with the designer's objectives. Ancillary to getting the Target Answer (a "yes" vote) is obtaining other types of support for the ballot measure.

The exemplary questions and answers follow:

1. Voters in the City are about to decide whether to set utility taxes at the average rate collected by nearby cities of similar size. This will save money for users of gas, electricity, water, telephone and video services, because the City now has the highest rate of tax of any city in California. What do you think?

I will probably vote "yes."
   I will probably vote "no."
   I probably won't vote.
   I need more information.

2. Which statement is true? City Council members, City employees, their unions and others predicting disaster if this passes:

Are telling the truth.
   Are genuinely worried about the consequences and may be exaggerating to influence voters, but they may also be partly right.
   Would say anything to make sure they can keep collecting as much money from me as they can.

3. Suppose we vote "yes" for an average tax. The City budget will go back to 1995 levels. What's the worst that could happen?

City officials could actually cut the most basic and popular services such as emergency response and street repair.
   City officials could actually cut things no one will miss or that can easily be provided voluntarily by others.
   City officials could resign in protest.
   In 1995 the City was a fine place to live. I'd be happy with the budget we had then.
   Revenues will soon creep up again.

4. When your utility rates go up, you have to pay more tax. The City gets to spend it, even though they weren't expecting it and it wasn't in the budget. Is this fair?

No, but it's not a big deal to me.
   No. They should reduce the tax when prices spike up.
   It's not about "fair." Taxes aren't earned anyway; they're taken for a good cause.

Note: Because fairness is a key consideration, even if the participant answers that this tax is not fair, the issue is further explored, and all answers lead to the next question, i.e., all responses to question number 4 are followed by question number 5:

5. If you needed to, how could you compensate for higher utility costs?

Vote "yes" to lower the tax.
   Eat out more often.
   Take my clothes to a Laundromat.
   Change the thermostat.

Skip the Christmas lights.
Buy more energy-efficient appliances.
Move to almost any other city in California where the tax is lower or non-existing.

Note: Either of the two answers underlined above produce the same next question, i.e., question number 6:

6. Unless they leave the City, everyone in it will be affected by reducing the utility tax to average. Which group(s) below are you most concerned will be hurt by the loss of revenue for the City?
Families with children
Condominium/Apartment owners/renters
People with medical needs
People with low incomes
Seniors
Landowners/homeowners
Employees of the City Note: Each of the above answers leads to questions based upon concrete examples. For example, choosing the answer "Families with children" or "People with low incomes" may lead to the next question (question number 7).

7. Jane Jones is a single mom with a low income. She is forced to pay for low-cost lunches for seniors, even though seniors are the wealthiest segment of the population. Is that fair?
Life isn't fair. Taxes aren't fair, but we have to have them. I support a City utility tax of 11%.
Sometimes people need help and who will do it if the government doesn't?
Maybe generous donors will help those less fortunate, but there are still other groups I worry will be hurt by cuts to city revenue.
Okay. Maybe the tax is too high to be fair to everyone.

8. Who do you think is most successful at getting what they need from City officials?
Fire/police
Downtown Business Association/Chamber of Commerce members
Individual non-union employees
Major employers
Service clubs/organizations such as Friends of the Dog Park
Federal or State government
Average individual citizen Note: In this example, all of the answers above lead to the next question (question number 9).

9. If you had a pet project you were passionate about, and you had lots of well-organized supporters, what would you prefer to do?
Go to the City and submit to their requirements and approval process in order to get some of our money back for the project
Skip the City approval process by raising the money among my well-organized supporters from their utility tax savings or other sources.

10. Which of the following would you be willing to do in order to save on your utility tax?
Vote to lower it.
Nothing. I don't want to save.
Send the kids to grandma's or call Mom collect.
Install a wind-turbine or get an antenna for my televisions.
Bathe less often
Wait for the City Council to lower it.

11. Suppose this tax reduction goes too far and cuts programs and services too much. What can we do?
Raise it, again.
Wait for revenues to catch up.
Raise it, but I'm worried we can't do it fast enough.

Note: Each of the two underlined answers leads to question number 12, which is the Target Question:

12. If the vote to set the City utility tax at the average of nearby similar-size cities was held today, how would you vote?
Yes.
No.
I still don't know.
I can't vote in the City, but if I could it would be "yes."
I can't vote in City, but if I could it would be "no."

Note: "Yes" is the Target Answer. The Target Answer leads to question number 13.

13. Thank you for exploring the City Utility Tax website. Please remember to vote "yes" on Apr. 13, 2004.

The remainder of the "map" is filled in with alternate routes that can be taken when a participant does not choose the direct route (i.e., the answer most in alignment with the designer's Target Answer(s)). The "map" is usually not two-dimensional but multi-dimensional. The map remains invisible to the participant who experiences each question and multiple-choice answer subset as if at a crossroads with a choice of directions to take, not knowing where any of them lead, or that many answers may take different routes to the same destination (i.e. the goal).

The following is an example of a side-trip or exploration which leads from one "key" question to the next "key" question:

1. Voters in the City are about to decide whether to set utility taxes at the average rate collected by nearby cities of similar size. This will save money for users of gas, electricity, water, telephone, and video services because the City now has the highest rate of tax of any city in California. What do you think?
I will probably vote "yes."
I will probably vote "no."
I probably won't vote.
I need more information.

The above underlined choice leads to the following question and answer subset:

2. Why won't you vote?
I'm not eligible to vote.
I'm not registered to vote.
I don't care what happens.
I don't think my vote counts.
I hate politics. Voting only encourages politicians.

Note: Each of the above underlined choices leads to the following question and answer subset:

3. Suppose you could wave a magic wand and implement the measure to make the utility tax in the City average. Would you?
Yes, I would make the utility tax average.
No, I would keep it at 11%

The following is another example of a side trip or exploration.

1. If you needed to, how could you compensate for higher utility costs?
Vote "yes" to lower the tax.
Eat out more often.
Take my clothes to a Laundromat.
Change the thermostat.
Skip the Christmas lights.
Buy more energy-efficient appliances.
Move to almost any other city in California where the tax is lower or non-existing.

2. If you eat at a restaurant in the City, whose money pays for the restaurant's utility tax?

Mine, and that's fair
Mine, and that's not fair
My boyfriend's.

Any time a participant chooses a potential solution to a problem which causes a problem(s) of its own, the participant may be asked what the problem(s) might be, and then if it is worse than the original problem, and further, how likely that his potential solution will ever be applied. Similarly, if a participant seeks a certain benefit, he can be asked if certain features (e.g., of a product, service, membership, etc.) would help provide that benefit, and then whether those features remove his objection.

Another potential concern arises when questions with potentially many preferred answers. These can keep looping back until the participant decides to continue. The following is an example of this looping technique:

1. What is your main concern?
   I'm afraid if it passes, my favorite programs and services will be hurt.
   I just don't feel that taking money from the City (and their employees) is very nice. They need the money.
   I'm afraid they'll find out I (we) voted for it and be angry with me.
   What if they raise other taxes and fees?
2. Select a favorite program or service:
   Schools
   Independence Day Fireworks
   Public Library
   Emergency response (Fire/Police)
   I'd like to go back and pick different reason for voting against an average tax.
   What you say here about my favorite programs and services has not convinced me to vote "yes" to make our utility taxes average.
   But I keep hearing bad things will happen. Are they lying?
3. Good News! Utility taxes don't pay for schools; they have separate funding. Better News! Reducing the utility tax to average will save City private schools, homeschoolers, teachers and employees who live in the City money.
   Okay, I might vote "yes" or just stay out of it.
   I'd like to pick a different program or service that concerns me.
   No matter what you say about my favorite programs or services, I think they may be hurt, and I'm still against making our utility taxes average.
   What about the claims of people who are against it? Are they lying?
   I'm not interested in most of these programs or services.
4. Select a favorite program or service:
   Schools
   Independence Day Fireworks
   Public Library
   Emergency response (Fire/Police)
   I'd like to go back and pick different reason for voting against an average tax.
   What you say here about my favorite programs and services has not convinced me to vote "yes" to make our utility taxes average.
5. Good News! The public library is run by Los Angeles County from an entirely different budget. By reducing the utility tax to average, library patrons will save money, too.
   Okay. I might vote "yes" or just stay out of it.
   I'd like to pick a different program or service that concerns me.
   No matter what you say about my favorite programs or services, I think they may be hurt, and I'm still against making our utility taxes average.
   What about the people who are against it. Are they lying?
   I'm not interested in most of these programs or services.
6. Select a favorite program or service:
   Schools
   Independence Day Fireworks
   Public Library
   Emergency response (Fire/Police
   I'd like to go back and pick different reason for voting against an average tax.
   What you say here about my favorite programs and services has not convinced me to vote "yes" to make our utility taxes average.
   But I keep hearing bad things will happen. Are they lying?
7. What is your main concern?
   I'm afraid if it passes, my favorite programs and services will be hurt.
   I just don't feel that taking money from the City (and their employees) is very nice. They need the money.
   I'm afraid they'll find out I (we) voted for it and be angry with me.
   What if they raise other taxes and fees?
8. A "yes" vote on this measure will not take one single penny from the City. Instead, it reduces the amount of money the City takes every month from you.
   You know what I mean: they're counting on being able to get that money from us to pay for programs and services.
   I'm a City employee or contractor. I need the money.
   I know a City employee or contractor. They need the money.
   It's my duty.
   Note: Each of the above-indicated underlined choices leads to the same question (in this example the following question):
9. Why would the City Council place the employee's or contractor's job in jeopardy?
   Their work is not necessary.
   They aren't worth what they're paid
   They do a great job and their services are necessary, but if the City loses tax revenue, they'll be cut, anyway.
   All of the choices above, lead to the following question:
10. Which statement is true? City Council members, City employees, their unions and others predicting disaster if this passes:
    Are telling the truth.
    Are genuinely worried about the consequences and may be exaggerating to influence voters, but they may also be partly right
    Would say anything to make sure they can keep collecting as much money from me as they can.

Examples of Closing Questions

At any point during the preceding examples that the designer has predetermined that a particular answer indicates that the participant has shifted his opinion or understanding toward a particular "key" question or toward the Target Answer(s), closing questions may be asked. The closing questions test whether the participant has abandoned his original opinion or understanding (or learned a new concept), or whether the participant still has other reasons for resisting the Target Answer(s). Depending on his answers, the "map" may send him back to a previous "key" question where the participant may choose a different answer from his previous answer, or start him on a "side-trip" or series of questions regarding the issue or concept.

The ultimate sequence of the closing questions in a preferred embodiment includes a "Thank you" message and may be followed by offers to join, purchase, be contacted, or sent a certificate, or whatever the designer deems appropriate.

Note that these offers may vary, again, depending on the prior answer(s). Set forth below is an example of closing questions.

1. Will you vote "yes" on Measure U?

Yes

No

I don't know

I can't vote

2. Thank you for exploring the City Utility Tax website. Please remember to vote "yes" on Apr. 13, 2004. Would you be willing to:

Donate funds toward a mailing encouraging a "Yes" vote?

Donate funds toward printing signs supporting the tax reduction?

Put a sign in your front yard?

None of the above, but I will vote "Yes."

The participant may then be presented with the appropriate contact information on the display in response to his answer to question number 2.

In an alternative embodiment, one answer for a plurality of the questions may be to contact the designer and suggest an answer other than the multiple choice answers provided. This allows the designer to consider these answers for addition along with any counter-arguments (in the form of questions and answers) and helps prevent frustrating the participant. When such an option is chosen, the participant may be invited, also, to return and choose another answer or be asked another question returning to the "map" at another appropriate point.

The ability to "go back" is utilized in another preferred embodiment. This allows the participant to reconsider an answer. It is also possible that more than one answer may be agreeable and a different follow-up question may be presented to the participant.

As discussed and illustrated above, it is also possible that all answers (or less than all answers) to a question may elicit the same next question since sometimes the point the designer wishes to make is taught by the juxtaposition of the answers. Often, regardless of the answer chosen, the next question may be relevant. Also, ideas, facts and information may be contained in the answers presented instead of trying to put the information into the question. A participant may reject the information if he desires (e.g., if he thinks it is biased). Agreement should not be forced upon the participant.

Questions may also be implied, as when a sentence is started, and the "answers" consists of choosing one of the presented alternatives to finish it. Also, answers may be responses to the question which do not answer the question (e.g., a comment or question).

Software or hardware may be used which allows questions to be stored and presented in response to input by the participant. Question and answer subsets may be stored in a database as individual records or placed on web pages together with other subsets. Question or answers may also be generated by software combining generic questions or answers with data provided earlier by the participant, or by using the data provided to determine how questions or answers are selected. One preferred embodiment to implement the invention on the Internet (or a computer network) is to use Hyper Text Markup Language code ("HTML") and make every question an "anchor" (unique location) and every answer a "hyperlink" to (bringing up on the screen) the next question and answer subset.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

The invention claimed is:

1. A computer implemented method for persuading participants to accept and/or understand a concept, position or idea, the method comprising the steps of:

creating a logic map comprising question-and-answer sets, and including defining a target answer, secondary answers, rational lines of reasoning corresponding to defined characteristics for leading participants to choose the target answer or one of the secondary answers, and based on the defined characteristics, defining multiple-choice interlinked question-and-answer sets corresponding to the lines of reasoning, such that an answer to a question-and-answers set links to a next question of a question-and-answers set, and including defining qualifying question-and-answer sets and configured to determine concurrence and non-concurrence with the concept, defining leading question-and-answer sets linked to the qualifying question-and-answers sets and configured to lead the prospective participants to concurrence with the concept, and defining closing question-and-answer sets linked to the qualifying question-and-answers sets and the leading question-and-answers sets and at an end of the lines of reasoning and including the target answer;

generating by a server computer a first question-and-answer set from the logic map, wherein a client computer accesses a first generated question-and-answer set from the server computer;

receiving by the server computer an answer selected by a participant from the first generated question-and-answer set via the client computer;

generating by the server computer a second question-and-answer set associated in the logic map with the selected answer to the first generated question-and-answer set; and repeating the steps of generating by the server computer question-and-answer sets, receiving selections to answers from the generated question-and-answer sets, and generating by the server computer question-and-answer sets associated with the selected answers to the generated question-and-answer sets, until the participant has reached a closing question-and-answer set corresponding to the end of a line of reasoning.

2. The method of claim 1, wherein the question-and-answer sets include question-and-answer sets seeking the participant's further agreement in order to reinforce the agreement indicated by participant's choice of a desired answer to a question.

3. The method of claim 1, wherein the question-and-answer sets include question-and-answer sets seeking to logically challenge the participant's answer to a question when participant's answer indicates they hold a position that is contrary to the desired position.

4. The method of claim 1, wherein the question-and-answer sets include question-and-answer sets including additional information in the question or in the answers designed to inform the participant's understanding of the line of argument and favorably influence participant's answers to a question or questions.

5. The method of claim 1, wherein of the question-and-answer sets includes one of a narrative, a picture, an avatar, and an audio or video presentation.

6. The method of claim 1, wherein the question-and-answer sets are read to the participant by an intermediary, and participant's answer choices are input into the system by the intermediary.

7. A computer implemented system for persuading participants to accept and/or understand a concept, position or idea, the system comprising:
a server computer; and
a logic map accessed by the server computer, wherein the logic map is created comprising question-and-answer sets, and including defining a target answer, secondary answers, rational lines of reasoning corresponding to defined characteristics for leading participants to choose the target answer or one of the secondary answers, and based on the defined characteristics, defining multiple-choice interlinked question-and-answer sets corresponding to the lines of reasoning, such that an answer to a question-and-answers set links to a next question of a question-and-answers set, and including defining qualifying question-and-answer sets and configured to determine concurrence and non-concurrence with the concept, defining leading question-and-answer sets linked to the qualifying question-and-answers sets and configured to lead the prospective participants to concurrence with the concept, and defining closing question-and-answer sets linked to the qualifying question-and-answers sets and the leading question-and-answers sets and at an end of the lines of reasoning and including the target answer,
wherein a client computer accesses a first generated question-and-answer set from the server computer, the server computer receives an answer selected by a participant from the first generated question-and-answer set via the client computer, the server computer generates a second question-and-answer set associated in the logic map with the selected answer to the first generated question-and-answer set, and
the steps of generating by the server question-and-answer sets, receiving selections to answers from the generated question-and-answer sets, and generating by the server question-and-answer sets associated with the selected answers to the generated question-and-answer sets are repeated, until the participant has reached a closing question-and-answer set corresponding to the end of a line of reasoning.

8. The system of claim 7, wherein the question-and-answer sets include question-and-answer sets seeking the participant's further agreement in order to reinforce the agreement indicated by participant's choice of a desired answer to a question.

9. The system of claim 7, wherein the question-and-answer sets include question-and-answer sets seeking to logically challenge the participant's answer to a question when participant's answer indicates they hold a position that is contrary to the desired position.

10. The system of claim 7, wherein the question-and-answer sets include question-and-answer sets including additional information in the question or in the answers designed to inform the participant's understanding of the line of argument and favorably influence participant's answers to a question or questions.

11. The system of claim 7, wherein of the question-and-answer sets includes one of a narrative, a picture, an avatar, and an audio or video presentation.

12. The system of claim 7, wherein the question-and-answer sets are read to the participant by an intermediary, and participant's answer choices are input into the system by the intermediary.

13. A computer program product for persuading participants to accept and/or understand a concept, position or idea, and including computer readable instructions embedded on a tangible, non-transitory computer readable medium and configured to cause computer processors to perform the step of:
creating a logic map comprising question-and-answer sets, and including defining a target answer, secondary answers, rational lines of reasoning corresponding to defined characteristics for leading participants to choose the target answer or one of the secondary answers, and based on the defined characteristics, defining multiple-choice interlinked question-and-answer sets corresponding to the lines of reasoning, such that an answer to a question-and-answers set links to a next question of a question-and-answers set, and including defining qualifying question-and-answer sets and configured to determine concurrence and non-concurrence with the concept, defining leading question-and-answer sets linked to the qualifying question-and-answers sets and configured to lead the prospective participants to concurrence with the concept, and defining closing question-and-answer sets linked to the qualifying question-and-answers sets and the leading question-and-answers sets and at an end of the lines of reasoning and including the target answer;
generating by a server computer a first question-and-answer set from the logic map, wherein a client computer accesses a first generated question-and-answer set from the server computer;
receiving by the server computer an answer selected by a participant from the first generated question-and-answer set via the client computer;
generating by the server computer a second question-and-answer set associated in the logic map with the selected answer to the first generated question-and-answer set; and
repeating the steps of generating by the server computer question-and-answer sets, receiving selections to answers from the generated question-and-answer sets, and generating by the server computer question-and-answer sets associated with the selected answers to the generated question-and-answer sets, until the participant has reached a closing question-and-answer set corresponding to the end of a line of reasoning.

14. The computer program product of claim 13, wherein the question-and-answer sets include question-and-answer sets seeking the participant's further agreement in order to reinforce the agreement indicated by participant's choice of a desired answer to a question.

15. The computer program product of claim 13, wherein the question-and-answer sets include question-and-answer sets seeking to logically challenge the participant's answer to a question when participant's answer indicates they hold a position that is contrary to the desired position.

16. The computer program product of claim 13, wherein the question-and-answer sets include question-and-answer sets including additional information in the question or in the answers designed to inform the participant's understanding of the line of argument and favorably influence participant's answers to a question or questions.

17. The computer program product of claim 13, wherein of the question-and-answer sets includes one of a narrative, a picture, an avatar, and an audio or video presentation.

18. The computer program product of claim 13, wherein the question-and-answer sets are read to the participant by an intermediary, and participant's answer choices are input into the system by the intermediary.

* * * * *